United States Patent
Lee et al.

(10) Patent No.: US 11,551,048 B2
(45) Date of Patent: Jan. 10, 2023

(54) SMART CARD

(71) Applicant: Samsung Electronics Co., Ltd., Suwon-si (KR)

(72) Inventors: Ju Ri Lee, Suwon-si (KR); Kyeong Do Kim, Gwangmyeong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 63 days.

(21) Appl. No.: 17/317,111

(22) Filed: May 11, 2021

(65) Prior Publication Data

US 2021/0406630 A1 Dec. 30, 2021

(30) Foreign Application Priority Data

Jun. 24, 2020 (KR) .................. 10-2020-0076884
Jan. 5, 2021 (KR) .................. 10-2021-0000928

(51) Int. Cl.
*G06K 19/07* (2006.01)
*G06K 19/073* (2006.01)
*G05F 1/46* (2006.01)

(52) U.S. Cl.
CPC ........... *G06K 19/0715* (2013.01); *G05F 1/46* (2013.01); *G06K 19/07354* (2013.01)

(58) Field of Classification Search
CPC ......... G06K 19/0715; G06K 19/07354; G06K 19/0701; G05F 1/46
See application file for complete search history.

(56) References Cited

U.S. PATENT DOCUMENTS

| | | | |
|---|---|---|---|
| 5,721,535 A | 2/1998 | Ikefuji | |
| 6,738,276 B2 | 5/2004 | Yu | |
| 6,946,950 B1 | 9/2005 | Ueno et al. | |
| 7,215,251 B2 | 5/2007 | Hyde | |
| 7,800,436 B2* | 9/2010 | Yamazaki | H04B 1/06 329/370 |
| 8,358,209 B2 | 1/2013 | Shafer et al. | |
| 8,593,254 B2 | 11/2013 | Okuda | |
| 8,862,054 B2 | 10/2014 | Ishizaki | |

(Continued)

FOREIGN PATENT DOCUMENTS

KR 101172224 B1 8/2012

*Primary Examiner* — Seung H Lee
(74) *Attorney, Agent, or Firm* — Harness, Dickey & Pierce, P.L.C.

(57) ABSTRACT

A smart card with improved power stability is provided. The smart card comprises a rectification signal line through which a rectification signal extracted from a radio frequency (RF) signal is provided; a regulator configured to regulate a voltage of the rectification signal line to a first voltage; a power circuit configured to extract a power component from the rectification signal using an output of the regulator; a logic circuit configured to receive the power component and generate a reception enable signal on the basis of the power component; a demodulator which is enabled by the reception enable signal provided from the logic circuit and configured to extract a signal component from the rectification signal; a capacitor controller which is enabled by the reception enable signal provided from the logic circuit and configured to generate a capacitor enable signal; and a capacitor circuit which is connected to the rectification signal line and has capacitance changed according to the capacitor enable signal.

20 Claims, 12 Drawing Sheets

(56) References Cited

U.S. PATENT DOCUMENTS

| | | |
|---|---|---|
| 8,922,333 B1 | 12/2014 | Kirkjan |
| 10,218,210 B2 | 2/2019 | Yang et al. |
| 10,432,023 B2 * | 10/2019 | Goulier .................. H02J 50/20 |
| 10,454,313 B2 | 10/2019 | Hwang et al. |
| 2003/0197598 A1 * | 10/2003 | Hayashi ............. G06K 19/0723 |
| | | 455/41.1 |
| 2007/0188297 A1 * | 8/2007 | Nakane ............. G06K 19/0723 |
| | | 340/5.6 |
| 2017/0323166 A1 * | 11/2017 | Colussi ............ G06K 19/07354 |

* cited by examiner

SMART CARD

This application claims priority from Korean Patent Application No. 10-2020-0076884, filed on Jun. 24, 2020, and Korean Patent Application No. 10-2021-0000928, filed on Jan. 5, 2021 in the Korean Intellectual Property Office, the disclosure of which is incorporated herein by reference in its entirety.

BACKGROUND

1. Field

The present disclosure relates to a smart card. Specifically, the present disclosure relates to a smart card based on biometric authentication.

2. Description of the Related Art

When users purchase goods at stores, credit cards are used and are inserted into point of sale (POS) terminals of offline stores, and the POS terminals read user's payment information from the credit cards to perform payment for the goods. However, even when someone who is not registered uses a credit card, payment for goods is often performed, and thus credit cards equipped with an authentication unit are being developed.

Biometrics has entered the spotlight as promising user authentication technology due to its strong security level and convenient usability. Recently, for user authentication in commercial products such as smartphones, notebook computers, and/or the like, biometrics in which a single type of biometric information about a fingerprint, an iris, or facial recognition, is used, or biometrics in which a combination of multiple types of biometric information is used has been used. Further, the biometrics is also used in border control systems in many countries in combination with electronic passport systems.

As the movement to use biometric information as an authentication unit is becoming more active, systems that perform access control or payment authentication using a unit such as a fingerprint or an iris are increasing in recent years. In particular, systems using fingerprints have been used relatively widely since the systems are easy to use and there is no resistance on the part of a user.

SUMMARY

Aspects of the present disclosure provide a smart card with improved power stability.

Aspects of the present disclosure also provide a smart card with reduced distortion of communication signals.

However, example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to example embodiments of the present disclosure, the smart card comprises a rectification signal line through which a rectification signal extracted from a radio frequency (RF) signal is provided; a regulator configured to regulate a voltage of the rectification signal line to a first voltage; a power circuit configured to extract a power component from the rectification signal using an output of the regulator; a logic circuit configured to receive the power component and generate a reception enable signal on the basis of the power component; a demodulator which is enabled by the reception enable signal provided from the logic circuit and configured to extract a signal component from the rectification signal; a capacitor controller which is enabled by the reception enable signal provided from the logic circuit and configured to generate a capacitor enable signal; and a capacitor circuit which is connected to the rectification signal line and has capacitance changed according to the capacitor enable signal.

According to the aforementioned and other example embodiments of the present disclosure, the smart card comprises a rectifier configured to extract a rectification signal from a radio frequency (RF) signal; a power circuit configured to extract a power component from the rectification signal; a demodulator configured to extract a signal component from the rectification signal; and a capacitor circuit configured to receive the rectification signal, wherein the capacitor circuit has a first capacitance while the signal component is extracted from the rectification signal and has a second capacitance different from the first capacitance while the signal component is not extracted from the rectification signal.

According to the aforementioned and other example embodiments of the present disclosure, the smart card comprises a radio frequency (RF) module which includes a rectification signal line through which a rectification signal extracted from a RF signal is provided and a capacitor circuit connected to the rectification signal line and which is configured to perform an operation of extracting a power component from the rectification signal and an operation of extracting a signal component from the rectification signal; and a logic circuit configured to provide a communication enable signal for controlling the operation of extracting the signal component of the RF module to the RF module, wherein the capacitor circuit has a first capacitance in response to the communication enable signal of a first level and has a second capacitance different from the first capacitance in response to the communication enable signal of a second level different from the first level.

Other features and example embodiments may be apparent from the following detailed description, the drawings and the claims.

BRIEF DESCRIPTION OF THE DRAWINGS

The above and other aspects and features of the present disclosure will become more apparent by describing example embodiments thereof in detail with reference to the attached drawings, in which.

DETAILED DESCRIPTION OF EXAMPLE EMBODIMENTS

Hereinafter, example embodiments according to the inventive concepts of the present disclosure will be described with reference to the accompanying drawings.

Hereinafter, smart cards according to some example embodiments will be described with reference to FIGS. 1 to 9.

Figure 1:
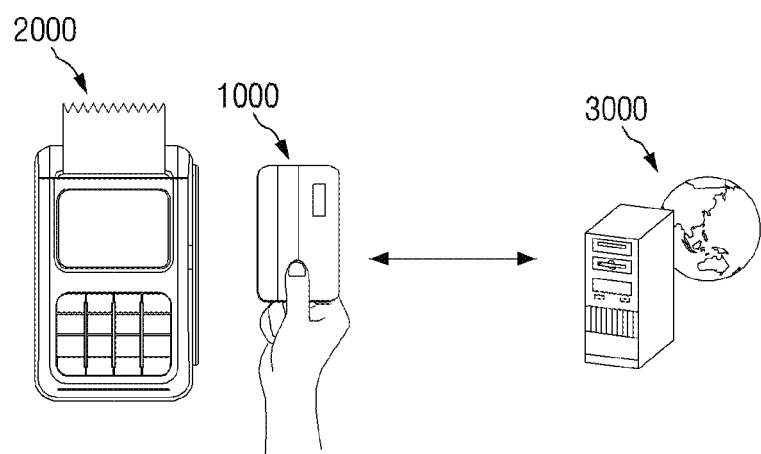
FIG. 1 is a diagram illustrating a smart card payment system based on biometric authentication according to some example embodiments.

FIG. 1 is a diagram illustrating a smart card payment system based on biometric authentication according to some example embodiments.

Referring to FIG. 1, the smart card payment system based on biometric authentication according to some example embodiments may include a smart card 1000, a payment terminal 2000, and/or a payment server 3000.

The smart card 1000 may be in the form in which a semiconductor chip supporting various functions is inserted into a plastic card having a credit card shape. In some example embodiments, the smart card 1000 may be implemented in a contact manner in which the smart card 1000 operates when an integrated chip 100 in the smart card 1000 and the payment terminal 2000 are brought into contact with each other. Alternatively, the smart card 1000 may be implemented in a non-contact manner in which data may be transferred and received when the integrated chip 100 and the payment terminal 2000 are in close proximity.

In some example embodiments, when payment request information including deposit information is output from the payment terminal 2000 in an on/offline sale store, the smart card 1000 may output payment method information corresponding to the payment request information.

In some example embodiments, the payment terminal 2000 may be a unit for storing deposit information about types, the number, and prices of products sold on/offline and managing sales information for each product. In some example embodiments, in the example of an offline sale store, the payment terminal 2000 may be a point of sale (POS) terminal in the store. In other example embodiments, in the example of an online sale store, the payment terminal 2000 may be an online shopping mall system. In still other example embodiments, the payment terminal 2000 may be a terminal device capable of accessing a smart card to read payment-related information and communicating with the payment server 3000.

The payment terminal 2000 may be a unit which is installed in an offline sale store and is capable of reading product information from a barcode attached to each product using a reader or the like. In some example embodiments, the product information may include information about a product type, a product code, a sales price, and/or the like.

The payment terminal 2000 may transfer sales-related information to the payment server 3000. In some example embodiments, the sales-related information may include at least one of sales price information, an identification (ID) of the payment terminal 2000, a time when the payment terminal 2000 reads sales price information of a product, a type of operation that the payment terminal 2000 intends to process, domain information about a management server of the payment terminal 2000, and deposit account information about an owner of the payment terminal 2000.

Further, the payment terminal 2000 may transfer payment information read from the smart card 1000 to the payment server 3000. The payment information may include payment level information and payment method information of a user, which are registered in the smart card 1000.

In some example embodiments, the payment method information may include payment account information or payment card information. In some example embodiments, the payment account information is information related to a bank account of the user and may include at least one of a bank account number, an account password, and a security-related authentication number. In some example embodiments, the payment card information may include information about at least one of a credit card company that makes payment, a card number, and a card password.

Further, the payment terminal 2000 may check whether the user is a registered user of the read smart card 1000 on the basis of biometric authentication information among the payment information read from the smart card 1000, and when the user is the registered user, payment level information corresponding to a user index of the corresponding user may be transferred to the payment server 3000.

The payment server 3000 may determine whether to approve payment on the basis of the sales-related information and payment information received from the payment terminal 2000 and may transfer an approval determination result to the payment terminal 2000. In some example embodiments, based on the payment information, the payment server 3000 may determine whether to approve payment for the amount according to the sales-related information on the basis of the received payment method information and payment level information.

For example, when the payment information is the payment account information, the payment server 3000 may be a payment server of a financial institution (a bank, etc.) in which the user has opened a financial account. For example, when the payment information is the payment card information, the payment server 3000 may be a payment server of a financial institution in which the user has opened a payment card.

In this specification, a normal user is a registered user stored in the payment server 3000 and may refer to a user who has a payment account of which an amount is greater than or equal to the amount requested for payment or a user who has a payment card in which the amount requested for payment is within a usable limit range. When it is determined that the user is the normal user, the payment server 3000 may check the sales price information and the ID of the payment terminal 2000 from the sales-related information, compare the pieces of information to the payment information, and determine whether to approve the payment.

Figure 2:
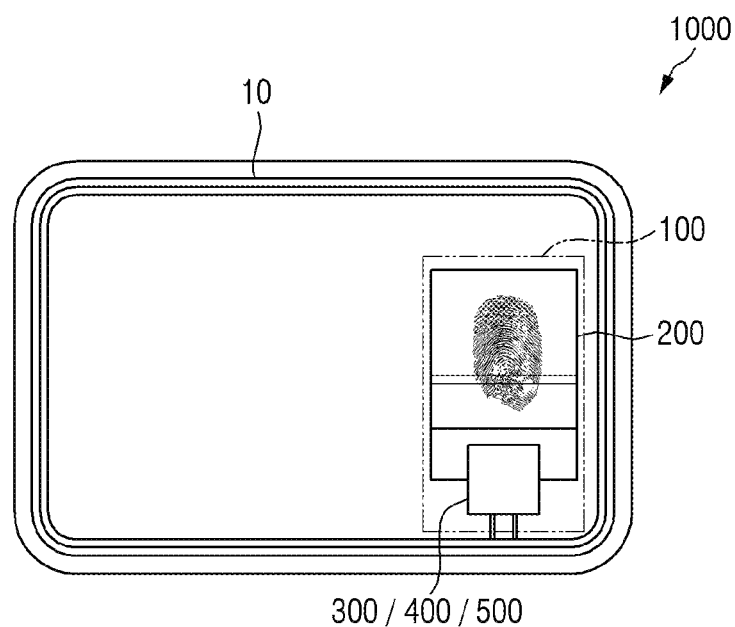
FIG. 2 is a diagram for describing a smart card according to some example embodiments.
Figure 3:
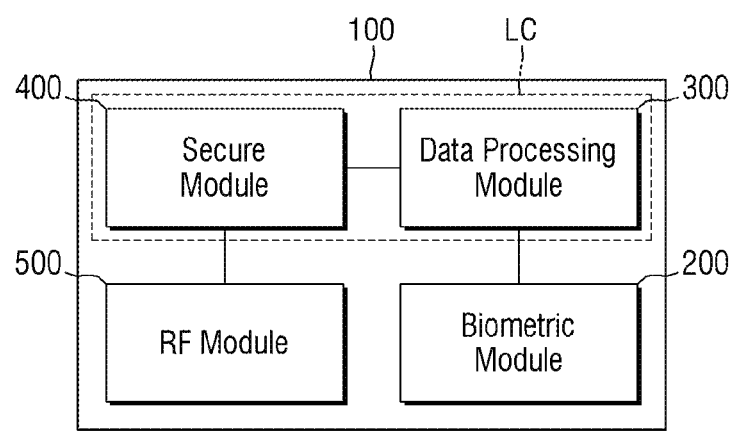
FIG. 3 is a block diagram for describing a biometric authentication integrated chip according to some example embodiments.

FIG. 2 is a diagram for describing a smart card according to some example embodiments. FIG. 3 is a block diagram for describing a biometric authentication integrated chip according to some example embodiments.

Referring to FIGS. 2 and 3, a smart card 1000 may include an antenna 10 and an integrated chip 100. The integrated chip 100 may include a biometrics module 200, an information processing module 300, a security module 400, and/or a radio frequency (RF) module 500 in one chip.

The biometrics module 200 may be a unit for reinforcing the security of the smart card 1000. The biometrics module 200 may determine whether fingerprint information of a real owner (e.g., a person registered in advance) of the smart card 1000 matches fingerprint information of the card user. When it is determined that the fingerprints match, by authenticating that the user is the real owner of the card, the lock of the security module 400 embedded in the smart card 1000 may be released for a determined period of time. The biometrics module 200 may automatically turn off the release of the lock after the determined period of time to reduce or prevent illegal use of the smart card 1000.

In some example embodiments, the biometrics module 200 is a sensor that senses a fingerprint or the like and may be a sensor that senses a fingerprint using an electrostatic method, a piezoelectric method, or the like. The biometrics module 200 may be implemented in a swipe method in which a fingerprint is sensed by swiping a finger or may be implemented in an area method in which a fingerprint is sensed by touching a finger for a determined period of time.

In some example embodiments, the security module 400 may be an integrated circuit in which card ID information of the smart card 1000 is recorded and stored. The security module 400 may transfer the recorded card ID information to a payment terminal 2000 using a contact or non-contact manner so that electronic payment may be performed.

In some example embodiments, the security module 400 may temporarily record the card ID information and may modify or delete the recorded card ID information. The security module 400 may record card ID information for one piece of payment method information among a plurality of pieces of payment method information. In some example embodiments, the card ID information is information corresponding to the payment method information and includes pieces of information necessary for electronic payment, such as card number information, card valid date information, card security information, and/or the like.

The security module 400 requires a high security requirement specification of an Evaluation Assurance Level (EAL5+) or higher. In order to meet the security requirement specification, all internal components in the security module 400 and data processed by the security module 400 may be encrypted based on a random key. For example, the security module 400 may encrypt and store the fingerprint information of the real card owner (a person registered in advance) and reduce or prevent external exposure of the fingerprint information.

Thereafter, when verification of the fingerprint information extracted by the biometrics module 200 is required due to the use of the smart card 1000, the security module 400 may receive the registered fingerprint information from the information processing module 300 and determine whether to approve the use of the smart card 1000 according to a matching result.

In some example embodiments, the information processing module 300 may generate a fingerprint template by processing a raw image of the fingerprint received from the biometrics module 200. The raw image may include minutiae, which are feature points of the fingerprint, that is, detailed feature points such as ridge ends or bifurcations found in the image of the fingerprint. The information processing module 300 may obtain template information of the corresponding fingerprint image, that is, fingerprint information for verification, by detecting the minutiae.

In some example embodiments, the RF module 500 may receive an RF signal from the antenna 10 and process the received RF signal. For example, the RF module 500 may extract a power component and a signal component from the RF signal. The extracted power component may be used in a logic circuit LC including the information processing module 300 and the security module 400. Further, the extracted signal component may be processed in the logic circuit LC including the information processing module 300 and the security module 400. That is, the RF module 500 may connect an external payment terminal 2000 and the antenna 10 to the logic circuit LC. The RF module 500 may process the RF signal to provide the power component and the signal component to the logic circuit LC, and may receive a signal from the logic circuit LC, process the signal, and provide the processed signal to the payment terminal 2000.

A peripheral circuit 220 of the biometrics module 200, the information processing module 300, the security module 400, and the RF module 500 may be implemented as one integrated chip. That is, the components 200, 300, 400, and 500 may be integrated into one chip. A description of each of the components 200, 300, 400, and 500 in the integrated chip 100 will be given below in detail with reference to FIGS. 4 to 9.

Figure 4:
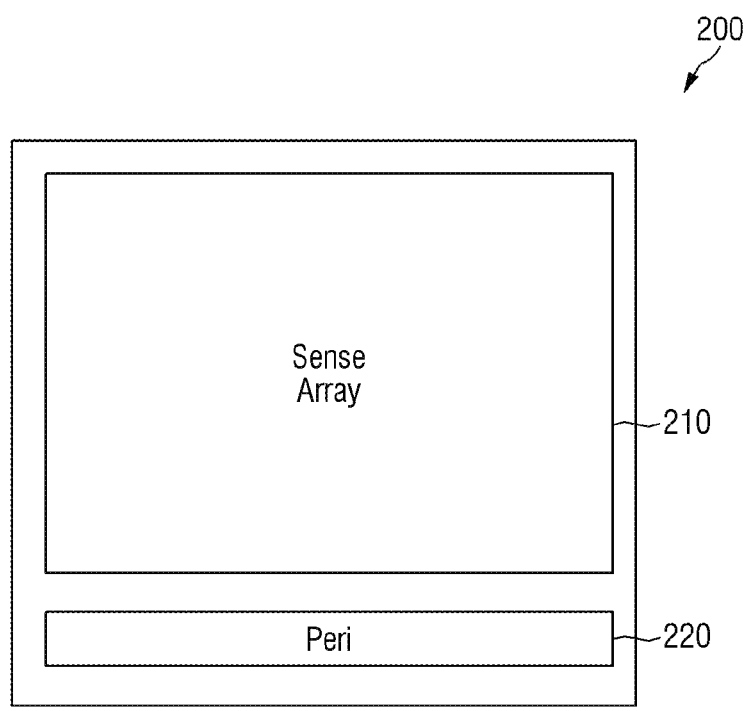
FIG. 4 is a diagram illustrating the biometrics module of FIG. 3.

FIG. 4 is a diagram illustrating the biometrics module of FIG. 3.

In some example embodiments, the biometrics module 200 may include a sensing array 210 that senses a fingerprint and the peripheral circuit 220 that drives the sensing array and receives and outputs a sensed raw image.

The sensing array 210 may detect a touch of a finger and obtain an image of a fingerprint by scanning the fingerprint of the touched finger. The sensing array 210 may scan the fingerprint of the finger with various methods such as a capacitive method, an optical method, a pressure method, a thermal sensing method, and/or the like. In some example embodiments, the sensing array 210 may sense the fingerprint by using a combination of a swipe method and a touch method. For example, in order to register the fingerprint, the sensing array 210 may obtain an image of the fingerprint using a swipe method and then extract feature points of the fingerprint, and in order to authenticate the fingerprint, the sensing array 210 may obtain an image of the fingerprint using a touch method and then extract feature points of the fingerprint.

The peripheral circuit 220 performs signal processes on a frame of the image of the fingerprint scanned by the sensing array 210 at a predetermined or alternatively, desired period (speed). For example, the peripheral circuit 220 may include an analog circuit, a noise filtering circuit, a signal sensitivity amplifying circuit, an analog-to-digital signal conversion circuit, and/or a digital circuit, which convert the image of the fingerprint into electrical signals. The peripheral circuit 220 may be implemented separately from the sensing array 210 in the form of an application-specific integrated circuit (ASIC) or implemented integrated with the sensing array 210. The peripheral circuit 220 may output the signal-processed raw image to the information processing module 300.

Figure 5:
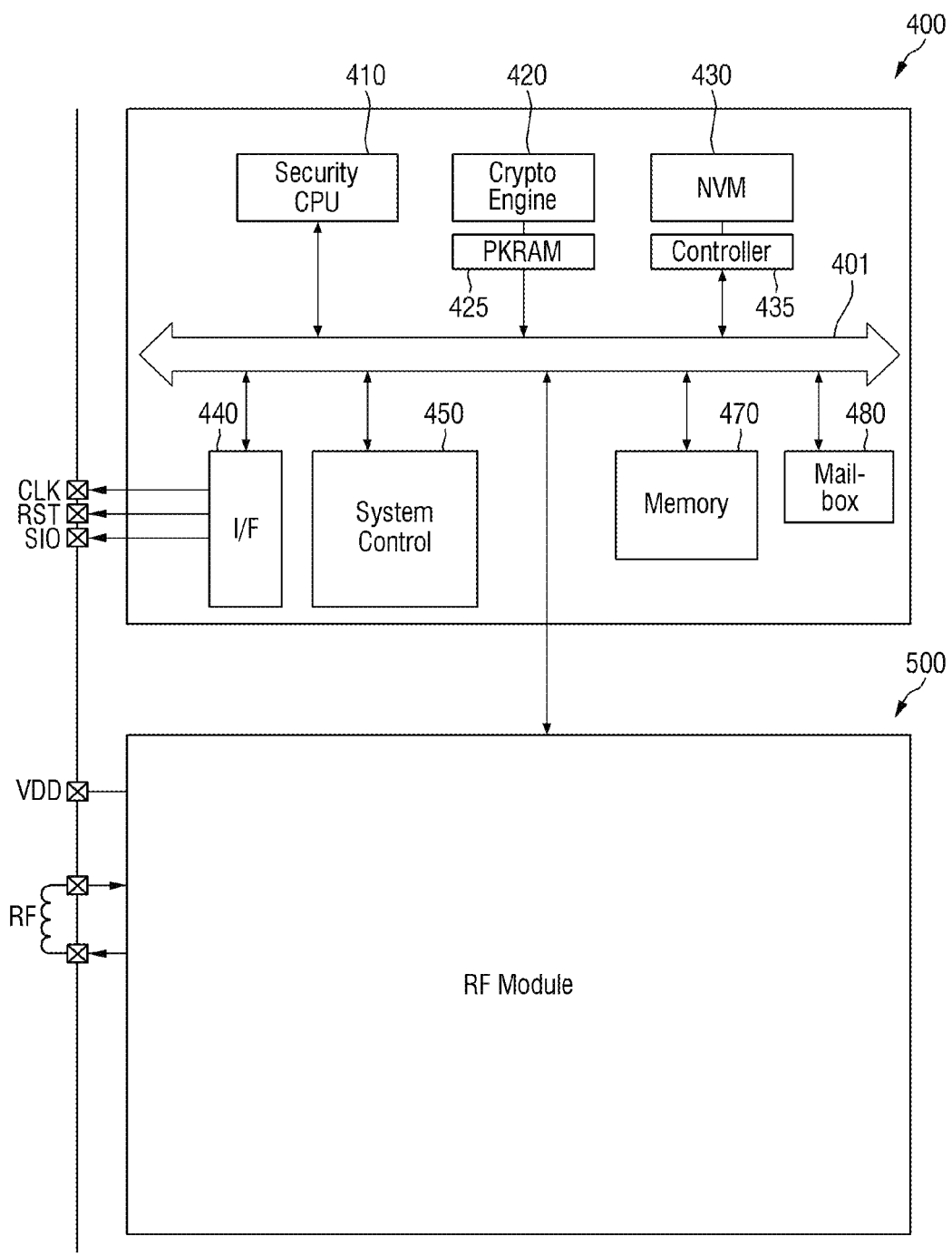
FIG. 5 is a block diagram illustrating the security module and RF module of FIG. 3.

FIG. 5 is a block diagram illustrating the security module and RF module of FIG. 3.

Referring to FIG. 5, the security module 400 may include a security central processing unit (CPU) 410, a crypto engine 420, a Preserved-over-Kexec random-access memory (PKRAM) 425, a non-volatile memory 430, a memory controller 435, an external interface 440, a system controller 450, a modem 460, a memory 470, a mailbox 480, and/or the like. Further, the security module 400 may receive a power component from the RF module 500 and transfer or receive a signal component to or from the RF module 500.

The components 410 to 480 of the security module 400 may communicate with each other through a bus 401. For example, the bus 401 may be provided as an advanced high-performance bus (AHB) interface.

The security CPU 410 may control the overall operation related to the security of the security module 400. For example, the security CPU 410 may match registered fingerprint information with fingerprint information for verification and determine whether to approve the use of a card in response to a payment request according to a result of the matching.

The crypto engine 420 may encrypt or decrypt data which will be transferred or received to or from external devices outside the security module 400. For example, the crypto engine 420 may perform a private key encryption and/or decryption operation on the basis of Advanced Encryption Standard (AES), Data Encryption Standard (DES), Secure Hash Algorithms (SHA), or the like. The crypto engine 420 may include a big number multiplier (e.g., Tornado) necessary for an operation such as error detection of encrypted or decrypted data, for example, Rivest-Shamir-Adleman (RSA)/elliptic curve cryptography (ECC).

The PKRAM 425 is a memory connected to the crypto engine 420 and may store a public key, and the crypto engine 420 may encrypt and/or decrypt the data using the public key and the private key.

The non-volatile memory 430 may be driven by the memory controller 435. The non-volatile memory 430 may store code for the security CPU 410 to operate, initial data, fingerprint information of a registered real user, and/or the like. Data, which is read from the non-volatile memory 430 and output, may further include an error correction code (ECC) bit corresponding to the stored data. The memory controller 435 may check an ECC bit of read data to detect an error, and correct the detected error.

The external interface 440 may receive a command from a host device (e.g., the payment terminal 2000) or transfer data obtained by processing the command to the host device. The external interface 440 may include a plurality of pins, for example, a clock signal pin CLK, a reset signal pin RST, and a data pin SIO. For example, the external interface may be connected with the host device according to the ISO/IEC 7816 standard to communicate with the host device.

The RF module 500 may provide the power component and the signal component, which are extracted from the RF signal provided from the antenna 10, to the security module 400. For example, unlike the external interface 440, the smart card 1000 may communicate with the host device through the RF module 500 in a non-contact manner.

The system controller 450 may perform system control operations, such as clock control, drive reset control, and power supply control of the smart card 1000.

The memory 470 may be a working memory that stores data generated during the operation of the security module 400. For example, the memory 470 may be a volatile memory such as a random access memory (RAM).

The mailbox 480 may communicate with the information processing module 300. That is, the information processing module 300 and the security module 400 may transfer or receive signals to or from each other through the mailbox 480.

Figure 6:
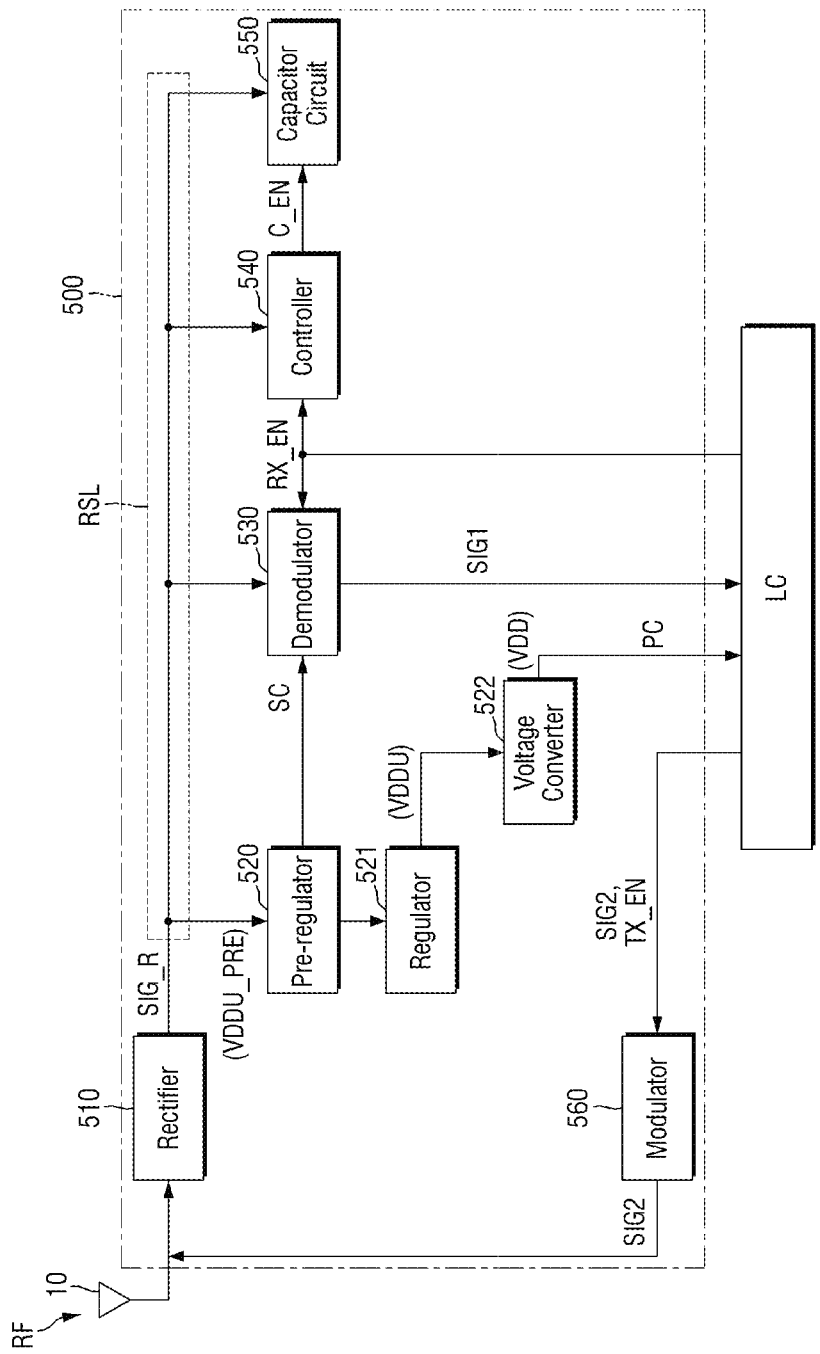
FIG. 6 is a block diagram for describing an RF module according to some example embodiments.

FIG. 6 is a block diagram for describing an RF module according to some example embodiments.

Referring to FIG. 6, an RF module 500 may include a rectifier 510, a pre-regulator 520, a regulator 521, a voltage converter 522, a demodulator 530, a controller 540, a capacitor circuit 550, a modulator 560, and/or the like. The RF module 500 may be connected to an antenna 10 and a logic circuit LC.

The antenna 10 may receive an RF signal RF from an external device. For example, the antenna 10 may receive an RF signal RF including payment information from a payment terminal 2000. The antenna 10 may be connected to the rectifier 510 and the modulator 560. The antenna 10 may provide the RF signal RF to the rectifier 510 and receive a second signal SIG2 from the modulator 560.

The rectifier 510 may extract a rectification signal SIG_R from the provided RF signal RF. The rectifier 510 may provide the extracted rectification signal SIG_R to a rectification signal line RSL. In some example embodiments, the rectification signal line RSL may be a component commonly connected to the rectifier 510, the pre-regulator 520, the demodulator 530, the controller 540, and/or the capacitor circuit 550. That is, the rectification signal SIG_R provided to the rectification signal line RSL may be commonly provided to the rectifier 510, the pre-regulator 520, the demodulator 530, the controller 540, and/or the capacitor circuit 550.

The pre-regulator 520 may receive the rectification signal SIG_R. The pre-regulator 520 may regulate a voltage of the rectification signal SIG_R to a pre-voltage VDDU_PRE. That is, a voltage of the rectification signal line RSL may be maintained as a specific pre-voltage VDDU_PRE by the pre-regulator 520. The pre-regulator 520 may maintain the voltage applied to the rectification signal line RSL constantly.

Further, the pre-regulator 520 may extract a signal component C from the rectification signal SIG_R and provide the extracted signal component C to the demodulator 530. In some example embodiments, the pre-regulator 520 may provide the signal component C of the rectification signal SIG_R to the demodulator 530 through a current mirror or the like. For example, the signal component C may include data to be transferred from the payment terminal 2000 to a smart card 1000. However, the signal component C before being transferred to the demodulator 530 may be in a state of a simple signal.

The regulator 521 may re-regulate the rectification signal SIG_R provided from the pre-regulator 520. For example, the regulator 521 may regulate the voltage of the rectification signal SIG_R to a first voltage VDDU. In some example embodiments, the first voltage VDDU may be different from the pre-voltage VDDU_PRE.

The voltage converter 522 may regulate the voltage of the rectification signal SIG_R transferred from the regulator 521 to a second voltage VDD. Further, the regulator 521 and the voltage converter 522 may extract a power component PC from the rectification signal SIG_R. That is, a voltage of the power component PC may be the second voltage VDD. When the power component PC is extracted, noise may be output from the voltage converter 522. The output noise may be transferred to the pre-regulator 520 through the regulator 521. The pre-regulator 520 may reduce or prevent the output noise and, accordingly, the rectification signal SIG_R provided to the rectification signal line RSL may not be distorted by noise.

Further, the second voltage VDD of the power component PC regulated by the voltage converter 522 may be lower than the first voltage VDDU and the pre-voltage VDDU_PRE. Accordingly, a current included in the power component PC may be increased. Further, accordingly, the logic circuit LC that receives the power component PC may use more current of the power component PC. The logic circuit LC may process signals by using the received power component PC.

The demodulator 530 may be connected to the rectification signal line RSL to receive the rectification signal SIG_R. Further, the demodulator 530 may receive the signal component C from the pre-regulator 520. The demodulator 530 may process the signal component C to output a first signal SIG1, and the output first signal SIG1 may be transferred to the logic circuit LC.

The demodulator 530 may receive a reception enable signal RX_EN from the logic circuit LC. The demodulator 530 may output the first signal SIG1 in response to the reception enable signal RX_EN. That is, when the reception enable signal RX_EN is received, the demodulator 530 may output the first signal SIG1, and when the reception enable signal RX_EN is not received, the demodulator 530 may not output the first signal SIG1. For example, when the reception enable signal RX_EN is at a first level, the demodulator 530 may output the first signal SIG1, and when the reception enable signal RX_EN is at a second level different from the first level, the demodulator 530 may not output the first signal SIG1. In some example embodiments, a magnitude of the first level may be greater than a magnitude of the second level. For example, the magnitude of the second level may be zero, but example embodiments of the present disclosure are not limited thereto.

The modulator 560 may receive a second signal SIG2 and a transmission enable signal TX_EN from the logic circuit LC. The logic circuit LC may process the received first signal SIG1 and output the second signal SIG2 and the transmission enable signal TX_EN in response to the first signal SIG1.

The modulator 560 may modulate the second signal SIG2 in response to the transmission enable signal TX_EN. For example, only when the transmission enable signal TX_EN is received, the modulator 560 may modulate the second signal SIG2 and transfer the second signal SIG2 to the antenna 10. In some example embodiments, the signal transferred to the antenna 10 may be the modulated second signal SIG2. The second signal SIG2 may be converted into an RF signal by the antenna 10 and transferred to the payment terminal 2000.

The controller 540 may be connected to the rectification signal line RSL to receive the rectification signal SIG_R. Further, the controller 540 may receive the reception enable signal RX_EN from the logic circuit LC. The controller 540 may output a capacitor enable signal C_EN in response to the reception enable signal RX_EN. That is, while the reception enable signal RX_EN is not provided to the controller 540, the controller 540 may not output the capacitor enable signal C_EN. However, example embodiments of the present disclosure are not limited thereto. The controller 540 may adjust the capacitance of the capacitor circuit 550 by transferring the capacitor enable signal C_EN to the capacitor circuit 550.

The capacitor circuit 550 may be connected to the rectification signal line RSL to receive the rectification signal SIG_R. That is, the capacitor circuit 550 may be commonly connected to the rectifier 510, the pre-regulator 520, the demodulator 530, the controller 540, and/or the like through the rectification signal line RSL. The capacitance of the capacitor circuit 550 may be adjusted by the controller 540. For example, the capacitance of the capacitor circuit 550 may be changed in response to the capacitor enable signal C_EN provided from the controller 540.

Figure 7:
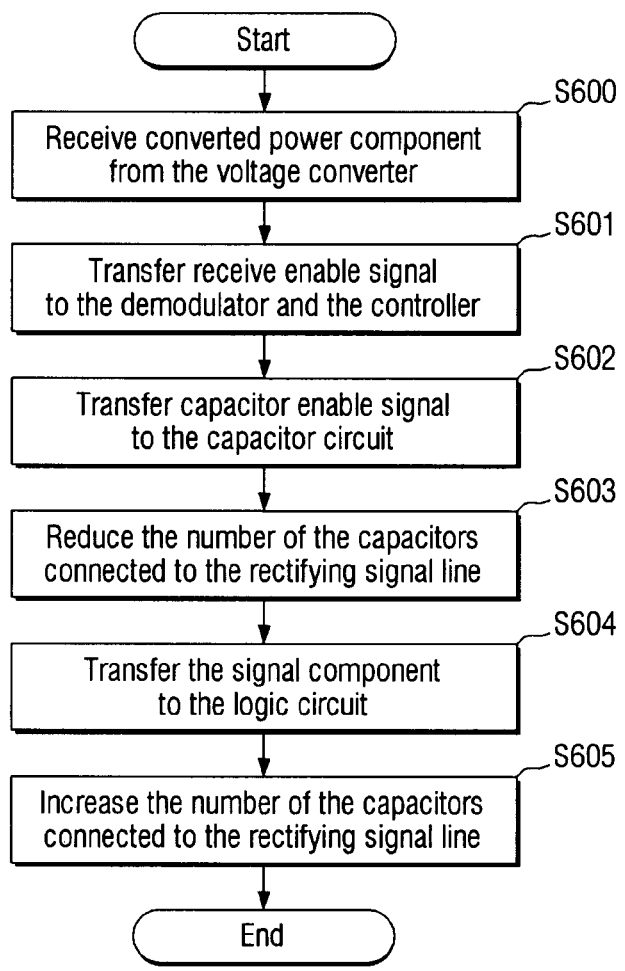
FIG. 7 is a flowchart for describing an operation of the RF module according to some example embodiments.
Figure 8:
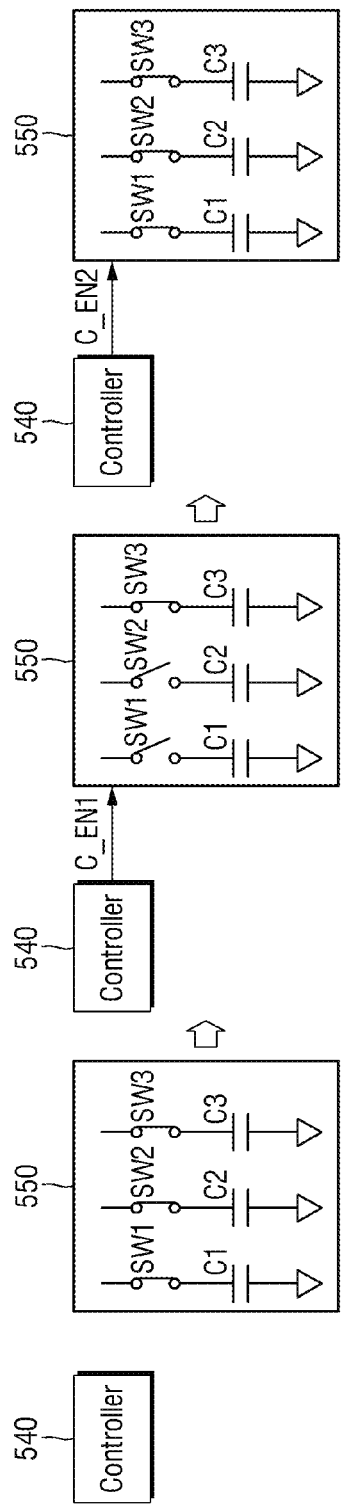
FIG. 8 is a diagram for describing an operation of the capacitor circuit according to some example embodiments.
Figure 9:
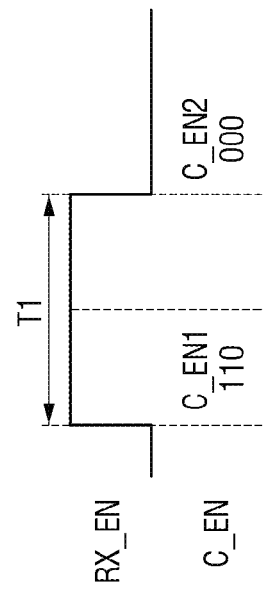
FIG. 9 is a timing diagram for describing the operation of the RF module according to some example embodiments.

FIG. 7 is a flowchart for describing an operation of the RF module according to some example embodiments. FIG. 8 is a diagram for describing an operation of the capacitor circuit according to some example embodiments. FIG. 9 is a timing diagram for describing the operation of the RF module according to some example embodiments.

Referring to FIGS. 6 to 9, the logic circuit LC may receive the converted power component PC from the voltage converter 522 (S600). The logic circuit LC may perform the biometric authentication procedure described above by using the power component PC. Thereafter, the logic circuit LC may transfer the reception enable signal RX_EN to the demodulator 530 and the controller 540 (S601). In some example embodiments, the reception enable signal RX_EN may be provided to the demodulator 530 and the controller 540 through a common line.

When the reception enable signal RX_EN is not provided to the controller 540, all switches included in the capacitor circuit 550 may be turned on. For example, a first switch SW1, a second switch SW2, and/or a third switch SW3 of the capacitor circuit 550 may all be turned on. A first capacitor C 1, a second capacitor C2, and a third capacitor C3 may all be connected to the rectification signal line RSL through the turned-on switches. That is, the capacitance of the capacitor circuit 550 connected to the rectification signal line RSL may be the sum (e.g., C1+C2+C3) of the capacitance of the first capacitor C1, the capacitance of the second capacitor C2, and the capacitance of the third capacitor C3. Power stability may be maintained by maintaining the capacitance of the rectification signal line RSL of the RF module 500.

The controller 540 may transfer the capacitor enable signal C_EN to the capacitor circuit 550 in response to the reception enable signal RX_EN (S602). For example, the reception enable signal RX_EN may be applied to the controller 540 during a first time period T1. When the reception enable signal RX_EN is applied, the controller 540 may transfer a first capacitor enable signal C_EN1 to the capacitor circuit 550.

The capacitor circuit 550 may reduce the number of capacitors connected to the rectification signal line RSL (S603). The capacitance of the capacitor circuit 550 may be reduced in response to the first capacitor enable signal C_EN1. For example, the first switch SW1 and the second switch SW2 may be turned off in response to the first capacitor enable signal C_EN1. That is, the capacitance of the capacitor circuit 550 may become the capacitance of the third capacitor C3. That is, the capacitance of the capacitor connected to the rectification signal line RSL may be become the capacitance of the third capacitor C3. That is, the capacitance of the capacitor connected to the rectification signal line RSL may be reduced compared to the previous capacitance of the capacitor circuit 550. Accordingly, the capacitance of the rectification signal line RSL when the first signal SIG1 is generated by the demodulator 530 may be reduced, and the distortion of the first signal SIG1 may be further reduced.

The demodulator 530 may transfer the signal component C to the logic circuit LC (S604). During the first time period T1, the demodulator 530 may transfer the signal component C or the first signal SIG1 to the logic circuit LC. That is, the demodulator 530 may operate during the first time period T1. In some example embodiments, the demodulator 530 may operate in response to the reception enable signal RX_EN transferred from the logic circuit LC. In some example embodiments, the capacitance of the capacitor circuit 550 connected to the rectification signal line RSL may be maintained as the capacitance of the third capacitor C3. That is, the first signal SIG1 output from the demodulator 530 may not be further distorted.

Thereafter, the capacitor circuit 550 may increase the number of capacitors connected to the rectification signal line RSL (S605). The capacitance of the capacitor circuit 550 may be increased in response to a second capacitor enable signal C_EN2. For example, the first switch SW1 and the second switch SW2 may be turned on in response to the second capacitor enable signal C_EN2. That is, the capacitance of the capacitor circuit 550 may become the sum (e.g., C1+C2+C3) of the capacitance of the first capacitor C1, the capacitance of the second capacitor C2, and the capacitance of the third capacitor C3 again. That is, the capacitance of the capacitor connected to the rectification signal line RSL may become the sum (e.g., C1+C2+C3) of the capacitance of the first capacitor C1, the capacitance of the second capacitor C2, and the capacitance of the third capacitor C3. That is, the capacitance of the capacitor connected to the rectification signal line RSL may be increased compared to the previous capacitance of the capacitor circuit 550. Accordingly, power stability of the components connected to the rectification signal line RSL may be further improved.

In some example embodiments, during a period of time in which a signal component C and a first signal component SIG1 are generated, the capacitance of the capacitor circuit 550 connected to a common signal line RSL may be reduced, thereby reducing the distortion of the signal generation, and during a period of time in which a signal component C and a first signal component SIG1 are not generated, the capacitance of the capacitor circuit 550 connected to the common signal line RSL may be increased, thereby improving power stability.

Hereinafter, an RF module 500 according to some other example embodiments will be described with reference to FIGS. 10 to 12.

Figure 10:
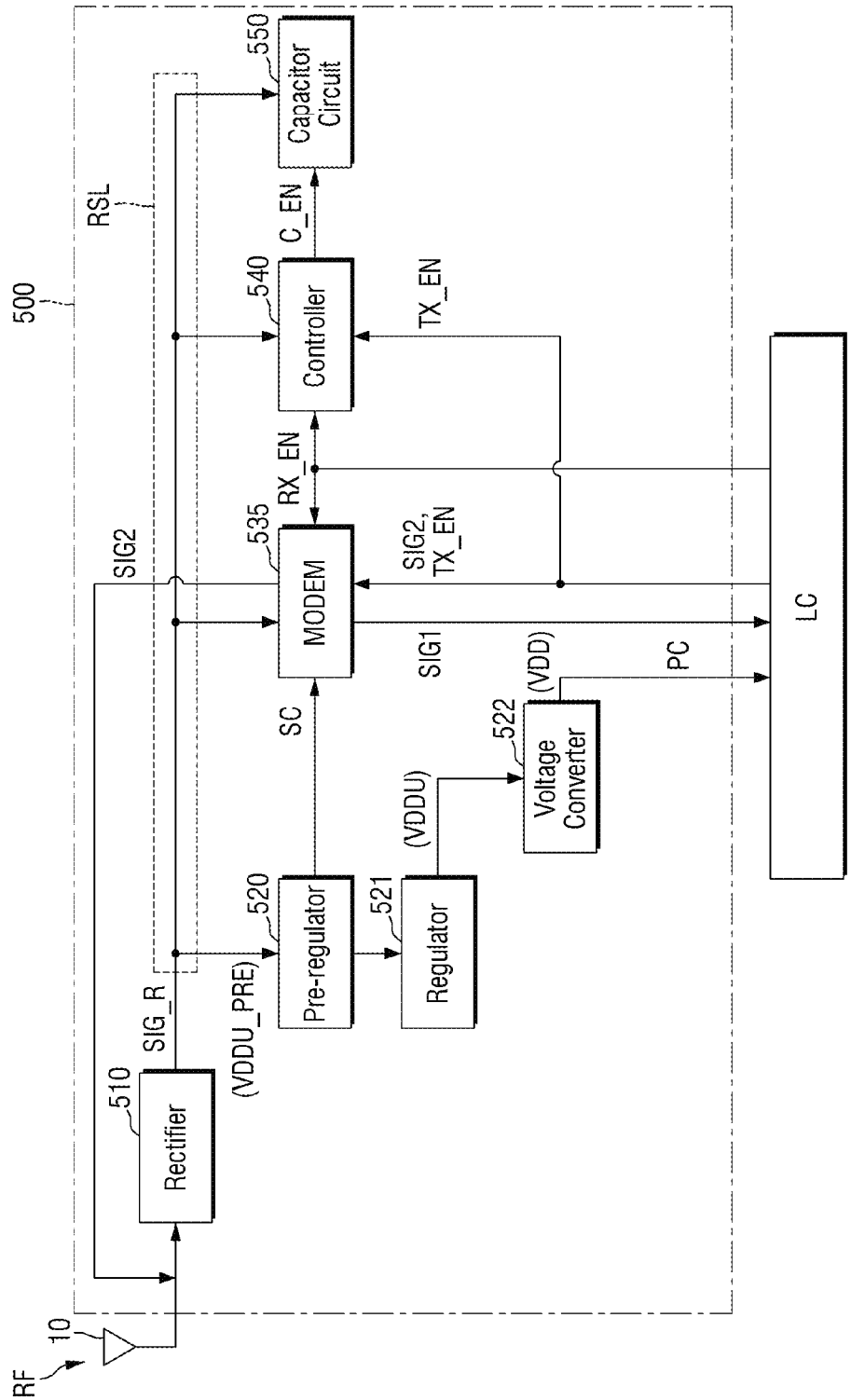
FIG. 10 is a block diagram for describing an RF module according to some example embodiments.

FIG. 10 is a block diagram for describing an RF module according to some example embodiments. FIGS. 11 and 12 are timing diagrams for describing an operation of the RF module according to some example embodiments. For convenience of description, descriptions of components identical to those described with reference to FIGS. 1 to 9 will be briefly described or omitted.

Referring to FIG. 10, the RF module 500 may include a modem 535. Unlike the RF module 500 described with reference to FIGS. 1 to 9, the RF module 500 may not include a demodulator 530 and a modulator 560. A modem 535 may perform all functions of the demodulator 530 and the modulator 560.

The modem 535 may be connected to a rectification signal line RSL. Further, the modem 535 may receive a signal component C from a pre-regulator 520 and receive a reception enable signal RX_EN, a transmission enable signal TX_EN, and a second signal SIG2 from a logic circuit LC. Further, the modem 535 may provide a first signal SIG1 to the logic circuit LC and provide a second signal SIG2 to an antenna 10. That is, the modem 535 may perform both demodulation and modulation of signals.

The modem 535 may operate in response to the reception enable signal RX_EN and the transmission enable signal TX_EN. Referring to FIGS. 11 and 12, the modem 535 may operate during a second time period T2 in which the reception enable signal RX_EN is provided and may operate during a third time period T3 in which the transmission enable signal TX_EN is provided. That is, the modem 535 may perform demodulation of the signal component C during the second time period T2 in which the reception enable signal RX_EN is provided and may perform modulation of the second signal SIG2 during the third time period T3 in which the transmission enable signal TX_EN is provided.

The reception enable signal RX_EN and the transmission enable signal TX_EN may be provided to a controller 540, and the controller 540 may adjust the capacitance of a capacitor circuit 550 while receiving the reception enable signal RX_EN and the transmission enable signal TX_EN.

Figure 11:
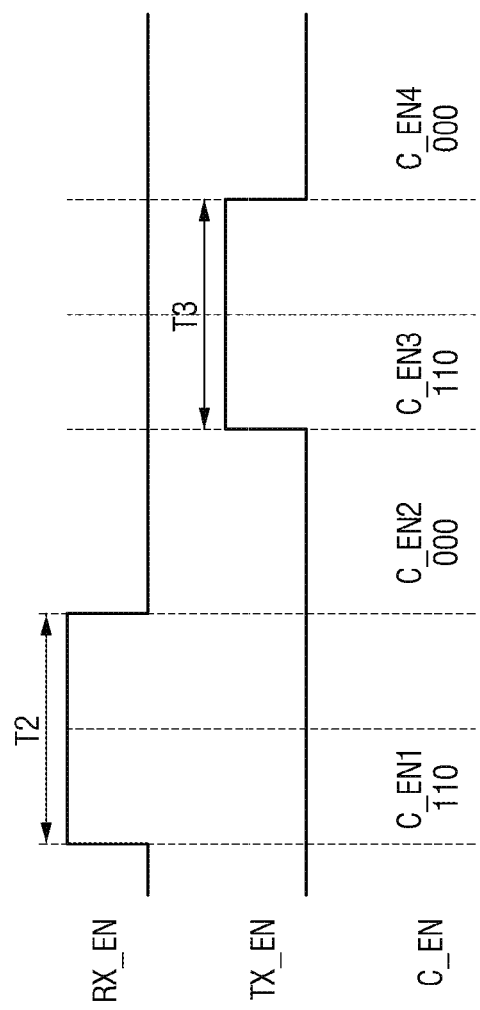
FIGS. 11 and 12 are timing diagrams for describing an operation of the RF module according to some example embodiments.

Referring to FIG. 11, during the second time period T2, the capacitance of the capacitor circuit 550 may be reduced, and after the second time period T2, the capacitance of the capacitor circuit 550 may be increased. Further, during the third time period T3, the capacitance of the capacitor circuit 550 may be reduced, and after the third time period T3, the capacitance of the capacitor circuit 550 may be increased. That is, the capacitance of the capacitor circuit 550 may be reduced only during the second time period T2 and the third time period T3. In other words, while the modem 535 performs the demodulation and modulation operations, the capacitance of the capacitor circuit 550 may be reduced and, accordingly, the distortion of the signals may be reduced.

Figure 12:
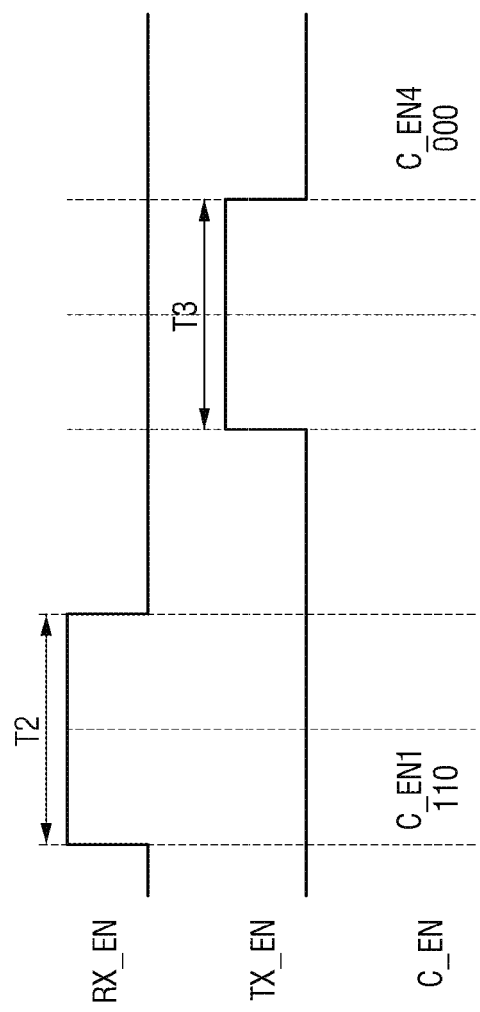

Referring to FIG. 12, during a time period from the start of the second time period T2 to end of the third time period T3, the capacitance of the capacitor circuit 550 may be reduced. That is, in the RF module 500, the capacitance of the capacitor circuit 550 connected to the rectification signal line RSL while the modem 535 operates may be smaller than the capacitance of the capacitor circuit 550 connected to the rectification signal line RSL while the modem 535 does not operate.

The example embodiments of the present disclosure have been described above with reference to the accompanying drawings, but the present disclosure is not limited to the example embodiments and may be manufactured in various different forms, and it will be understood by those skilled in the art that various modifications can be made without departing from the technical scope of the present disclosure and without changing essential features. Therefore, the above-described example embodiments should be considered in a descriptive sense only and not for purposes of limitation.

What is claimed is:

1. A smart card comprising:
a rectification signal line through which a rectification signal extracted from a radio frequency (RF) signal is provided;
a regulator configured to regulate a voltage of the rectification signal line to a first voltage;
a power circuit configured to extract a power component from the rectification signal using an output of the regulator;
a logic circuit configured to receive the power component and generate a reception enable signal on the basis of the power component;
a demodulator which is enabled by the reception enable signal provided from the logic circuit and configured to extract a signal component from the rectification signal;
a capacitor controller which is enabled by the reception enable signal provided from the logic circuit and configured to generate a capacitor enable signal; and
a capacitor circuit which is connected to the rectification signal line and has capacitance changed according to the capacitor enable signal.

2. The smart card of claim 1, wherein the capacitance of the capacitor circuit while the demodulator extracts the signal component from the rectification signal is smaller than the capacitance of the capacitor circuit while the demodulator does not operate.

3. The smart card of claim 1, wherein the capacitance of the capacitor circuit while the capacitor controller is enabled by the reception enable signal is smaller than the capacitance of the capacitor circuit while the capacitor controller is not enabled by the reception enable signal.

4. The smart card of claim 1, wherein the capacitor controller generates a first capacitor enable signal when enabled by the reception enable signal and generates a second capacitor enable signal when disabled by the reception enable signal.

5. The smart card of claim 4, wherein the capacitance of the capacitor circuit is reduced in response to the first capacitor enable signal, and the capacitance of the capacitor circuit is increased in response to the second capacitor enable signal.

6. The smart card of claim 1, further comprising a modulator connected to the logic circuit,
wherein the logic circuit generates a transmission enable signal and a data signal on the basis of the power component, and
the modulator is enabled by the transmission enable signal provided from the logic circuit and modulates the data signal.

7. The smart card of claim 6, wherein the capacitor controller is enabled by the transmission enable signal provided from the logic circuit and changes the capacitance of the capacitor circuit.

8. The smart card of claim 1, wherein the power circuit regulates a voltage of the power component to a second voltage lower than the first voltage.

9. The smart card of claim 1, wherein the logic circuit processes biometric information using the power component and the signal component.

10. A smart card comprising:
a rectifier configured to extract a rectification signal from a radio frequency (RF) signal;
a power circuit configured to extract a power component from the rectification signal;
a demodulator configured to extract a signal component from the rectification signal; and
a capacitor circuit configured to receive the rectification signal, wherein the capacitor circuit has a first capacitance while the signal component is extracted from the rectification signal and has a second capacitance different from the first capacitance while the signal component is not extracted from the rectification signal.

11. The smart card of claim 10, wherein the first capacitance is smaller than the second capacitance.

12. The smart card of claim 10, further comprising:
a logic circuit configured to generate a data signal using the power component and the signal component; and
a modulator configured to modulate the data signal provided from the logic circuit.

13. The smart card of claim 12, wherein the capacitor circuit has a third capacitance while the data signal is modulated and has a fourth capacitance different from the third capacitance while the data signal is not modulated.

14. The smart card of claim 12, wherein the capacitor circuit has the first capacitance while the data signal is modulated and has the second capacitance while the data signal is not modulated.

15. The smart card of claim 12, wherein the logic circuit processes biometric information using the power component and the signal component.

16. The smart card of claim 10, wherein the power circuit, the demodulator, and the capacitor circuit receive the rectification signal through a rectification signal line.

17. A smart card comprising:
a radio frequency (RF) module which includes a rectification signal line through which a rectification signal extracted from a RF signal is provided and a capacitor circuit connected to the rectification signal line and which is configured to perform an operation of extracting a power component from the rectification signal and an operation of extracting a signal component from the rectification signal; and
a logic circuit configured to provide a communication enable signal for controlling the operation of extracting the signal component of the RF module to the RF module,
wherein the capacitor circuit has a first capacitance in response to the communication enable signal of a first level and has a second capacitance different from the first capacitance in response to the communication enable signal of a second level different from the first level.

18. The smart card of claim 17, wherein the RF module performs the operation of extracting the signal component in response to the communication enable signal of the first level and does not perform the operation of extracting the signal component in response to the communication enable signal of the second level.

19. The smart card of claim 18, wherein the first capacitance is smaller than the second capacitance.

20. The smart card of claim 18, wherein a magnitude of the first level is greater than a magnitude of the second level.

* * * * *